United States Patent
Wu

(10) Patent No.: US 9,671,651 B2
(45) Date of Patent: Jun. 6, 2017

(54) DISPLAY PANEL AND DISPLAY DEVICE

(71) Applicant: Shenzhen China Star Optoelectronics Technology Co., Ltd., Shenzhen, Guangdong (CN)

(72) Inventor: Chuan Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 342 days.

(21) Appl. No.: 14/407,942

(22) PCT Filed: Dec. 8, 2014

(86) PCT No.: PCT/CN2014/093266
§ 371 (c)(1),
(2) Date: Dec. 12, 2014

(87) PCT Pub. No.: WO2016/082243
PCT Pub. Date: Jun. 2, 2016

(65) Prior Publication Data
US 2016/0349551 A1 Dec. 1, 2016

(30) Foreign Application Priority Data

Nov. 27, 2014 (CN) .......................... 2014 1 0709714

(51) Int. Cl.
*G02F 1/1335* (2006.01)
*G02F 1/1345* (2006.01)
*G02F 1/1339* (2006.01)

(52) U.S. Cl.
CPC .......... *G02F 1/1339* (2013.01); *G02F 1/1335* (2013.01); *G02F 1/133514* (2013.01)

(58) Field of Classification Search
CPC . G02F 1/1335; G02F 1/133514; G02F 1/1339
USPC ........................................ 349/106, 152, 190
See application file for complete search history.

(56) References Cited

U.S. PATENT DOCUMENTS

| 7,375,790 B2* | 5/2008 | Yun ..................... G02F 1/13394 349/153 |
| 2010/0014043 A1* | 1/2010 | Ootaguro .............. G02F 1/1339 349/154 |
| 2014/0049157 A1* | 2/2014 | Kim ........................ H01J 61/24 313/552 |

FOREIGN PATENT DOCUMENTS

JP              10073830 A    *   3/1998

\* cited by examiner

*Primary Examiner* — Hoan C Nguyen
(74) *Attorney, Agent, or Firm* — Andrew C. Cheng

(57) ABSTRACT

A display panel includes a first substrate and a second substrate disposed separately; a sealant disposed between the first substrate and the second substrate; and at least one color resist layer disposed between the first substrate and the second substrate; wherein, the at least one color resist layer and the sealant are disposed in an alternate arrangement, and are disposed between the first substrate and the second substrate in order to support the first substrate and the second substrate. A display device is also disclosed. Through replacing the spacers in the sealant with the color resist layer to support the first substrate and the second substrate, a display uneven phenomenon near the sealant of a narrow frame display panel is solved. In addition, because the color resist layer replaces the spacer, the cost of the spacer is saved so as to reduce the design cost.

3 Claims, 3 Drawing Sheets

DISPLAY PANEL AND DISPLAY DEVICE

BACKGROUND OF THE INVENTION

1. Field of the Invention

The present invention relates to the liquid crystal technology, and more particularly relates to a display panel and a display device using the display panel.

2. Description of Related Art

With the improvement of people's lives as well as the development of the technology, a display device has been widely used in people's lives. Especially, a narrow frame display panel has become a mainstream of the market. The narrow frame display panel has been applied in a variety of display devices.

In the display panel, in order to achieve a narrow frame design, electric conductive golden balls and spacers have been added into a sealant of the display panel such that the electric conductive golden balls and spacers support an upper substrate and a lower substrate. However, the material of the spacers is mainly melamine resin or polystyrene resin, and the compression ratio is larger than supporting elements in a display area of the display panel such that the spacers in the sealant of the display panel are compressed more seriously. As a result, a gap at the sealant is smaller than a gap at the display area in the middle portion of the display panel. A display uneven phenomenon is generated near the sealant. Besides, because the spacers are added in the sealant, the design cost is increased.

In summary, the present invention provides a display panel and display device to solve the above problems.

SUMMARY OF THE INVENTION

The technology problems solved by the present invention is to provide a display panel and a display device in order to solve a display uneven phenomenon near the sealant of a narrow frame display panel, save the cost of the spacer so as to reduce the design cost.

In order to solve the above technology problems, a technology solution utilized by the present invention is: a display panel, comprising: a first substrate and a second substrate disposed separately; a sealant disposed between the first substrate and the second substrate; and at least one color resist layer disposed between the first substrate and the second substrate; wherein, the at least one color resist layer and the sealant are disposed in an alternate arrangement, and are disposed between the first substrate and the second substrate in order to support the first substrate and the second substrate.

Wherein, a total width of the at least one color resist layer and the sealant ranges from 200 um to 4000 um.

Wherein, a width of the at least one color resist layer and a width of the sealant are the same.

Wherein, the at least one color resist layer has one color resist layer, and the one color resist layer is disposed adjacent to the sealant.

Wherein, the sealant includes a first sealant and a second sealant, and the one color resist layer is disposed between the first sealant and the second sealant.

Wherein, the at least one color resist layer includes a first color resist layer and a second color resist layer; the sealant is disposed between the first color resist layer and the second color resist layer.

Wherein, the at least one color resist layer is formed by at least two of a red sub-color resist, a green sub-color resist, and a blue sub-color resist; the at least one color resist layer is also disposed in parallel with horizontal planes where the first substrate and the second substrate are located.

Wherein, the at least one color resist layer is formed by at least one of a red sub-color resist, a green sub-color resist, and a blue sub-color resist; the at least one color resist layer is also perpendicular to horizontal planes where the first substrate and the second substrate are located.

Wherein, the at least one color resist layer and a color resist layer in a display area are both formed by using a same mask.

In order to solve the above technology problems, a technology solution utilized by the present invention is: a display device, wherein, the display device includes a display panel, and the display panel comprises: a first substrate and a second substrate disposed separately; a sealant disposed between the first substrate and the second substrate; and at least one color resist layer disposed between the first substrate and the second substrate; wherein, the at least one color resist layer and the sealant are disposed in an alternate arrangement, and are disposed between the first substrate and the second substrate in order to support the first substrate and the second substrate.

The beneficial effects of the present invention is: comparing to the prior art, the display panel of the present invention comprises: a first substrate and a second substrate disposed separately; a sealant disposed between the first substrate and the second substrate; and at least one color resist layer disposed between the first substrate and the second substrate; wherein, the at least one color resist layer and the sealant are disposed in an alternate arrangement, and are disposed between the first substrate and the second substrate in order to support the first substrate and the second substrate. Through above way, in the present invention, the color resist layer replace the spacer in the sealant to support the first substrate and the second substrate such that a display uneven phenomenon near the sealant of a narrow frame display panel is solved. In addition, because the color resist layer replaces the spacer, the cost of the spacer is saved so as to reduce the design cost.

DETAILED DESCRIPTION OF THE PREFERRED EMBODIMENT

The following content combines with the drawings and the embodiment for describing the present invention in detail.

Figure 1:
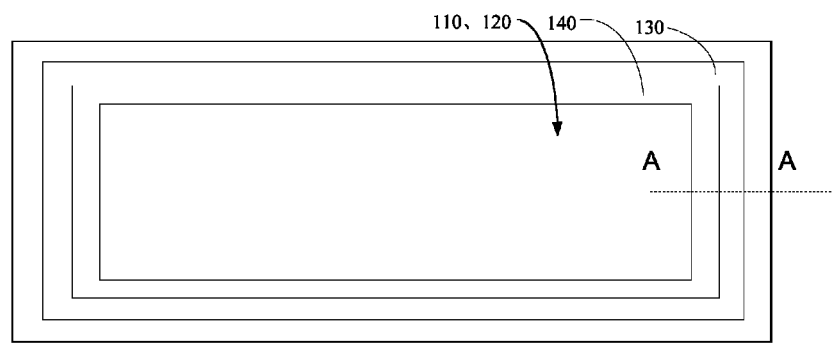
FIG. 1 is schematic diagram of a display panel according to the present invention.
Figure 2:
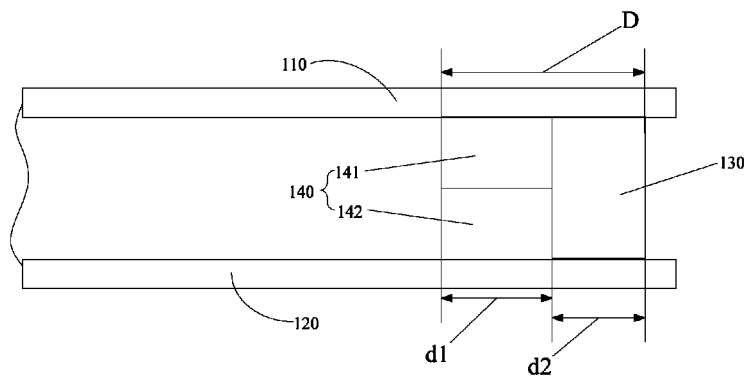
FIG. 2 is a schematic diagram of a cross-sectional line A-A according to a first embodiment of the display panel shown in FIG. 1.

The present invention discloses a display device, and the display device includes a display panel. As shown in FIG. 1 and FIG. 2, FIG. 1 is schematic diagram of a display panel according to the present invention; FIG. 2 is a schematic diagram of a cross-sectional line A-A according to a first embodiment of the display panel shown in FIG. 1.

The display panel includes a first substrate 110, a second substrate 120, a sealant 130, and at least one color resist layer 140. The first substrate 110 and the second substrate 120 are disposed separately. The sealant 130 is disposed surrounding and disposed between the first substrate 110 and the second substrate 120. The color resist layer 140 is disposed between the first substrate 110 and the second substrate 120. Wherein, the first substrate 110 is a thin-film-transistor array substrate, and the second substrate 120 is a color filter substrate. Or, the first substrate 110 is a color filter substrate, and the second substrate 120 is a thin-film-transistor array substrate.

In the present embodiment, the at least one color resist layer 140 and the sealant 130 are disposed between the first substrate 110 and the second substrate 120, and disposed in an alternate arrangement in order to support the first substrate 110 and the second substrate 120. That is, the at least one color resist layer 140 can replace spacers (not shown) or other supporting elements embedded in the sealant 130 for supporting the first substrate 110 and the second substrate 120.

In the present embodiment, in order to realize a narrow frame design, a total width D of the color resist layer 140 and the sealant 130 ranges from 200 um to 4000 um. Preferably, the total width D of the color resist layer 140 and the sealant 130 ranges from 500 um to 1000 um. Preferably, a width d1 of the color resist layer 140 and a width d2 of the sealant 130 are the same. In another embodiment, the width d1 of the color resist layer 140 is two times or three times of the width d2 of the sealant 130. Or, the width d2 of the sealant 130 is two times or three times of the width d1 of the color resist layer 140.

In the present embodiment, the at least one color resist layer 140 has one color resist layer. Of course, in another embodiment, the at least one color resist layer 140 has multiple color resist layers. The least one color resist layer 140 is disposed adjacently to the sealant 130. Preferably, the least one color resist layer 140 is disposed close to a display area of the display panel. That is, the least one color resist layer 140 contacts with a liquid crystal layer of the display panel.

Wherein, the at least one color resist layer 140 is disposed between the first substrate 110 and the second substrate 120, and formed by at least two of a red sub-color resist 141, a green sub-color resist 142 and a blue sub-color resist (not shown). The at least one color resist layer 140 is also disposed in parallel with horizontal planes where the first substrate 110 and the second substrate 120 are located. Each color resist layer is formed by at least one of the red sub-color resist 141, the green sub-color resist 142, and the blue sub-color resist. Because a thickness of the red sub-color resist 141, the green sub-color resist 142 or the blue sub-color resist is smaller. A height of a single layer of the sub-color resists is not enough to support the first substrate 110 and the second substrate 120. Therefore, two layers of the sub-color resists or above are overlapped between the first substrate 110 and the second substrate 120.

As shown in FIG. 2, the at least one color resist layer 140 is formed by one layer of the red sub-color resist 141 and one layer of the green sub-color resist 142. At the same time, the at least one color resist layer 140 is in parallel with horizontal planes where the first substrate 110 and the second substrate 120 are located. In other words, the red sub-color resist 141 and the green sub-color resist 142 are disposed in an overlapped way. That is, the red sub-color resist 141 contacts with the first subside 110, and the green sub-color resist 142 contacts with the second substrate 120. In another embodiment, the at least one color resist layer 140 can be formed by one layer of the red sub-color resist 141 and one layer of the blue sub-color resist; or, the at least one color resist layer 140 can be formed by one layer of the blue sub-color resist and one layer of the green sub-color resist 142; or the at least one color resist layer 140 can be formed by one layer of the red sub-color resist 141 and one layer of the blue sub-color resist.

Of course, the at least one color resist layer 140 can be formed by two layers of the red sub-color resist 141 and one layer of the blue sub-color resist. In addition, the forming of the at least one color resist layer 140 of the present invention is not limited to the red sub-color resist 141, the green sub-color resist 142, or the blue sub-color resist. The at least one color resist layer 140 can be formed by a new sub-color resist mixed by the red sub-color resist 141, the green sub-color resist 142, and the blue sub-color resist. For example, a yellow sub-color resist or a white sub-color resist.

In the present embodiment, the at least one color resist layer 140 can be formed by utilizing a same mask which is used for manufacturing a color resist layer in the display area of the display panel. That is, the manufacturing process of the at least one color resist layer 140 supported between the first substrate 110 and the second substrate 120 and the manufacturing process of the color resist layer in the display panel are the same in order to reduce the design cost.

Figure 3:
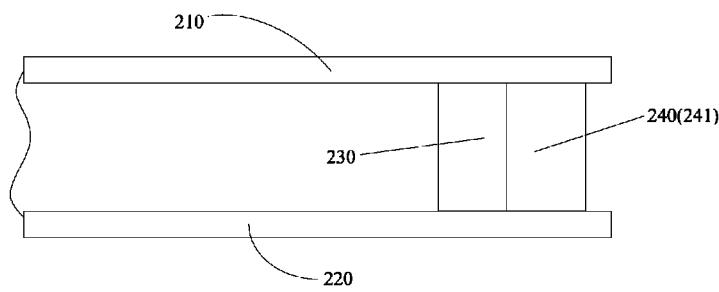
FIG. 3 is a schematic diagram of a cross-sectional line A-A according to a second embodiment of the display panel shown in FIG. 1.

With reference to FIG. 3, FIG. 3 is a schematic diagram of a cross-sectional line A-A according to a second embodiment of the display panel shown in FIG. 1. The first substrate 210 and the second substrate 220 in FIG. 3 correspond to the first substrate 110 and the second substrate 120 in FIG. 1. The main difference between the display panel in FIG. 3 and the display panel in FIG. 1 is: at least one color resist layer 240 is formed by one of a red sub-color resist 241, a green sub-color resist (not shown), and a blue sub-color resist (not shown) and is formed between the first substrate 210 and the second substrate 220 and is perpendicular to horizontal planes where the first substrate 210 and the second substrate 220 are disposed. In this embodiment, the at least one color resist layer 240 is formed by one layer of the red sub-color resist 241, and the red sub-color resist 241 is perpendicular to horizontal planes where the first substrate 210 and the second substrate 220 are located. Besides, the sealant 230 is close to the display area of the display panel. That is, the sealant 230 is contacted with a liquid crystal layer of the display panel.

Specifically, the red sub-color resist 241 is perpendicular to the first substrate 210 and the second substrate 220, wherein, a terminal of the red sub-color resist 241 contacts with the first substrate 210, the other terminal of the red sub-color resist 241 contacts with the second substrate 220. In another embodiment, the at least one color resist layer 240 is formed by one layer of the blue sub-color resist or one layer of the green color-resist. Or, the at least one color resist layer 240 is formed by one layer of the red sub-color resist 241 and one layer of the blue sub-color resist. Or, the at least one color resist layer 240 is formed by one layer of the blue sub-color resist and one layer of the green sub-color resist. Or, the at least one color resist layer 240 is formed by one layer of the red sub-color resist 241, one layer of the green sub-color resist and one layer of the blue sub-color resist. Of course, the at least one color resist layer 240 is formed by two layers of the red sub-color resist 241 and one layer of the blue sub-color resist. Or, the at least one color resist layer 240 is formed by one layer of the red sub-color resist 241 and two layers of the blue sub-color resist.

Figure 4:
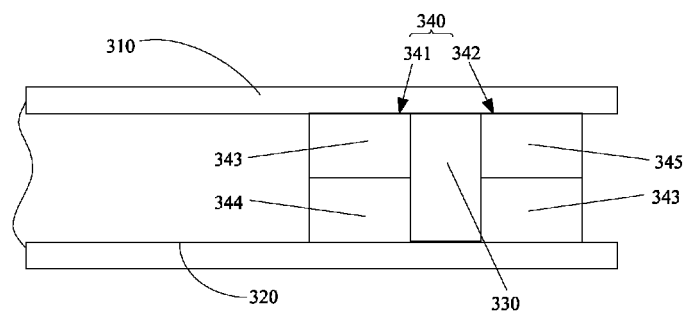
FIG. 4 is a schematic diagram of a cross-sectional line A-A according to a third embodiment of the display panel shown in FIG. 1.

With reference to FIG. 4, FIG. 4 is a schematic diagram of a cross-sectional line A-A according to a third embodiment of the display panel shown in FIG. 1. The first substrate 310 and the second substrate 320 in FIG. 4 correspond to the first substrate 110 and the second substrate 120 in FIG. 1. The main difference between the display panel in FIG. 4 and the display panel in FIG. 1 is: at least one color resist layer 340 includes a first color resist layer 341 and a second color resist layer 342. The sealant 330 is disposed between the first color resist layer 341 and the second color resist layer 342. Wherein, the first color resist layer 341 and the second color resist layer 342 are respectively formed by at least two of a red sub-color resist 343, a green sub-color resist 344 and a blue sub-color resist 345 and is disposed between the first substrate 310 and the second substrate 320. The first color resist layer 341 and the second color resist layer 342 are in parallel with horizontal planes where the first substrate 310 and the second substrate 320 are located.

In the present embodiment, the first color resist layer 341 is formed by a red sub-color resist 343 and a green sub-color resist 344 and disposed between the first substrate 310 and the second substrate 320 and disposed in parallel with horizontal planes where the first substrate 310 and the second substrate 320 are located. That is, the red sub-color resist 343 of the first color resist layer 341 contacts with the first substrate 310, and the green sub-color resist 344 contacts with the second substrate 320. The second color resist layer 342 is formed by a red sub-color resist 343 and a blue sub-color resist 345 and disposed between the first substrate 310 and the second substrate 320 and disposed in parallel with horizontal planes where the first substrate 310 and the second substrate 320 are located. That is, the blue sub-color resist 345 of the second color resist layer 342 contacts with the first substrate 310, and the red sub-color resist 343 of the second color resist layer 342 contacts with the second substrate 320. In another embodiment, the first color resist layer 341 and the second color resist layer 342 can be formed by other sub-color resists.

In the present embodiment, a width ratio of the first color resist layer 341, the sealant 330 and the second color resist layer 342 is 1:2:3. In another embodiment, a width ratio of the first color resist layer 341, the sealant 330 and the second color resist layer 342 is not limited to 1:2:3. The width ratio can be disposed according to an actual requirement.

Figure 5:
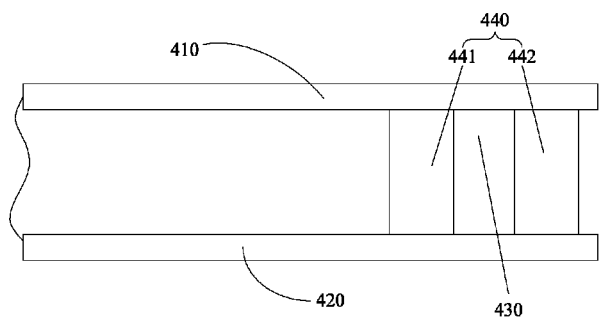
FIG. 5 is a schematic diagram of a cross-sectional line A-A according to a fourth embodiment of the display panel shown in FIG. 1.

With reference to FIG. 5, FIG. 5 is a schematic diagram of a cross-sectional line A-A according to a fourth embodiment of the display panel shown in FIG. 1. The first substrate 410 and the second substrate 420 in FIG. 5 correspond to the first substrate 310 and the second substrate 320 in FIG. 4. The main difference between the display panel in FIG. 5 and the display panel in FIG. 3 is: a first color resist layer 441 and a second color resist layer 442 are respectively formed by at least one of a red sub-color resist 441, a green sub-color resist 442, and a blue sub-color resist (not shown), and disposed between the first substrate 410 and the second substrate 420, and disposed perpendicular to horizontal planes where the first substrate 410 and the second substrate 420 are located. In this embodiment, the first color resist layer 441 is formed by the red sub-color resist 441. The red sub-color resist 441 respectively contacts with the first substrate 410 and the second substrate 420. The second color resist layer 442 is formed by the green sub-color resist 442. The green sub-color resist 442 respectively contacts with the first substrate 410 and the second substrate 420.

Preferably, a width ratio of the first color resist layer 441, the sealant 430 and the second color resist layer 442 is 1:1:1. Wherein, a width of the first color resist layer 441 and a width of the second color resist layer 442 are the same. In another embodiment, the width ratio of the first color resist layer 441, the sealant 430 and the second color resist layer 442 is not limited to 1:1:1. The width ratio can be disposed according to an actual requirement. For example, the width ratio of the first color resist layer 441, the sealant 430 and the second color resist layer 442 is 1:2:1 or 2:1:2.

Figure 6:
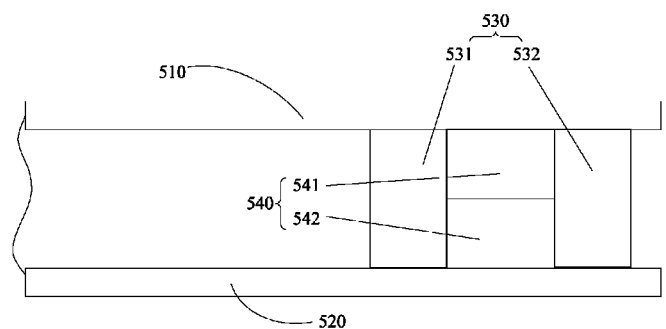
FIG. 6 is a schematic diagram of a cross-sectional line A-A according to a fifth embodiment of the display panel shown in FIG. 1.

With reference to FIG. 6, FIG. 6 is a schematic diagram of a cross-sectional line A-A according to a fifth embodiment of the display panel shown in FIG. 1. The first substrate 510 and the second substrate 520 in FIG. 6 correspond to the first substrate 110 and the second substrate 120 in FIG. 1. The main difference between the display panel in FIG. 6 and the display panel in FIG. 1 is: a sealant 530 includes a first sealant 531 and a second sealant 532. A color resist layer 540 is disposed between the first sealant 531 and the second sealant 532. The color resist layer 540 is formed by at least two of a red sub-color resist 541, a green sub-color resist 542, and a blue sub-color resist (not shown). The color resist layer 540 is disposed between the first substrate 510 and the second substrate 520, and is disposed in parallel with horizontal planes where the first substrate 510 and the second substrate 520 are located. Wherein, the color resist layer 540 has one color resist layer or multiple color resist layers.

In the present embodiment, the color resist layer 540 is formed by the red sub-color resist 541 and the green sub-color resist 542. The color resist layer 540 is also disposed in parallel with horizontal planes where the first substrate 510 and the second substrate 520 are located. That is, the red sub-color resist 541 contacts with the first substrate 510, and the green sub-color resist 542 contacts with the second substrate 520.

Figure 7:
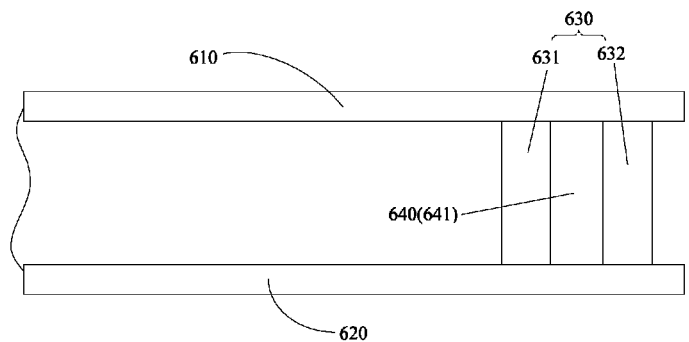
FIG. 7 is a schematic diagram of a cross-sectional line A-A according to a sixth embodiment of the display panel shown in FIG. 1.

With reference to FIG. 7, FIG. 7 is a schematic diagram of a cross-sectional line A-A according to a sixth embodiment of the display panel shown in FIG. 1. The first substrate 610 and the second substrate 620 in FIG. 7 correspond to the first substrate 510 and the second substrate 520 in FIG. 6. The main difference between the display panel in FIG. 7 and the display panel in FIG. 6 is: The sealant 630 comprises a first sealant 631 and a second sealant 632. The color resist layer 640 is formed by at least one of a red sub-color resist 641, a green sub-color resist (not shown), and a blue sub-color resist (not shown). The color resist layer 640 is disposed between the first substrate 610 and the second substrate 620. The color resist layer 640 is also disposed perpendicular to horizontal planes where the first substrate 610 and the second substrate 620 are located. In the present embodiment, the color resist layer 640 is formed by the red sub-color resist 641. The red sub-color resist 641 respectively contacts with the first substrate 610 and the second substrate 620.

In summary, the display panel of the present invention comprises: a first substrate and a second substrate disposed separately; a sealant disposed between the first substrate and the second substrate; and at least one color resist layer disposed between the first substrate and the second substrate; wherein, the at least one color resist layer and the sealant are disposed in an alternate arrangement, and are disposed between the first substrate and the second substrate in order to support the first substrate and the second substrate. Through above way, in the present invention, the color resist layer replace the spacer in the sealant to support the first substrate and the second substrate such that a display uneven phenomenon near the sealant of a narrow frame display panel is solved. In addition, because the color resist layer replaces the spacer, the cost of the spacer is saved so as to reduce the design cost.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display panel, comprising:
    a first substrate and a second substrate disposed separately;
    a sealant disposed between the first substrate and the second substrate; and
    at least one color resist layer disposed between the first substrate and the second substrate, and a top portion and a bottom portion of the at least one color resist layer are respectively and directly contacted with the first substrate and the second substrate;
    wherein, the at least one color resist layer and the sealant are disposed in an alternate arrangement, and are disposed between the first substrate and the second substrate in order to respectively and independently support the first substrate and the second substrate;
    wherein, a thickness of the at least one color resist layer and a thickness of the sealant are the same; and
    wherein, the at least one color resist layer includes a first color resist layer and a second color resist layer; the sealant is disposed between the first color resist layer and the second color resist layer, a thickness of each of the first color resist layer and the second color resist layer and a thickness of the sealant are the same, and each of the first color resist layer and the second color resist layer is formed by at least two of a red sub-color resist, a green sub-color resist, and a blue sub-color resist.

2. The display panel according to claim 1, wherein, a total width of the at least one color resist layer and the sealant ranges from 200 um to 4000 um.

3. The display panel according to claim 2, wherein, a width of the at least one color resist layer and a width of the sealant are the same.

* * * * *